US012528332B2

(12) United States Patent
Betz

(10) Patent No.: US 12,528,332 B2
(45) Date of Patent: Jan. 20, 2026

(54) METHOD FOR UNLOCKING A MOTOR VEHICLE AND FOR ENABLING AN ENGINE START OF A MOTOR VEHICLE

(71) Applicant: MERCEDES-BENZ GROUP AG, Stuttgart (DE)

(72) Inventor: Konrad Betz, Stuttgart (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 161 days.

(21) Appl. No.: 18/287,672

(22) PCT Filed: Feb. 9, 2022

(86) PCT No.: PCT/EP2022/053077
§ 371 (c)(1),
(2) Date: Oct. 20, 2023

(87) PCT Pub. No.: WO2022/223164
PCT Pub. Date: Oct. 27, 2022

(65) Prior Publication Data
US 2024/0198760 A1    Jun. 20, 2024

(30) Foreign Application Priority Data

Apr. 23, 2021  (DE) ..................... 10 2021 002 166.5

(51) Int. Cl.
*B60H 1/00*        (2006.01)
*B60R 25/021*    (2013.01)
(Continued)

(52) U.S. Cl.
CPC ....... *B60H 1/00657* (2013.01); *B60R 25/021* (2013.01); *B60R 25/045* (2013.01);
(Continued)

(58) Field of Classification Search
CPC .............. B60H 1/00657; B60R 25/021; B60R 25/045; B60R 25/06; B60R 25/209
See application file for complete search history.

(56) References Cited

U.S. PATENT DOCUMENTS

| 7,224,980 B2 | 5/2007 | Hara |
| 2015/0163649 A1* | 6/2015 | Chen ........................ H04W 4/80 455/418 |

(Continued)

FOREIGN PATENT DOCUMENTS

| DE | 60123892 T2 | 5/2007 |
| DE | 102016217318 A1 | 2/2018 |

(Continued)

OTHER PUBLICATIONS

Office Action dated Apr. 30, 2025 in related/corresponding KR Application No. 10-2023-7035836.
International Search Report and Written Opinion mailed Jun. 3, 2022 in related/corresponding international Application No. PCT/EP2022/053077.
Office Action created Feb. 1, 2022 in related/corresponding DE Application No. 10 2021 002 166.5.

*Primary Examiner* — Jess Whittington
*Assistant Examiner* — Jason Nguyen
(74) *Attorney, Agent, or Firm* — PATENT PORTFOLIO BUILDERS PLLC

(57) ABSTRACT

A method for unlocking and enabling an engine start a motor vehicle using a vehicle key involves the motor vehicle having at least one outer node for wireless connection with the vehicle key outside an interior of the motor vehicle, at least one inner node for wireless connection with the vehicle key inside the interior of the motor vehicle, and a control system. The method involves first producing a wireless connection between the vehicle key and the outer node, and then unlocking the motor vehicle. The method then involves forcibly ending the existing wireless connection between the (Continued)

vehicle key and the outer node and then forcibly producing a new wireless connection between the vehicle key and the inner node.

9 Claims, 2 Drawing Sheets

(51) Int. Cl.
  *B60R 25/045*    (2013.01)
  *B60R 25/06*     (2006.01)
  *B60R 25/20*     (2013.01)
  *B60R 25/24*     (2013.01)

(52) U.S. Cl.
  CPC ............ *B60R 25/06* (2013.01); *B60R 25/209* (2013.01); *B60R 25/24* (2013.01)

(56) References Cited

U.S. PATENT DOCUMENTS

| | | |
|---|---|---|
| 2017/0064517 A1 | 3/2017 | Lee et al. |
| 2017/0149946 A1 | 5/2017 | Buttolo et al. |
| 2017/0164192 A1 | 6/2017 | Schussmann et al. |
| 2018/0247472 A1 | 8/2018 | Odejerte, Jr. et al. |
| 2018/0268628 A1 | 9/2018 | Jain et al. |
| 2019/0035184 A1* | 1/2019 | Okada .................... B60R 25/40 |
| 2020/0186970 A1* | 6/2020 | Dekovich ............... H04W 4/40 |

FOREIGN PATENT DOCUMENTS

| | | | |
|---|---|---|---|
| EP | 3367713 B1 | | 3/2021 |
| JP | 2014175856 A | * | 9/2014 |
| KR | 1020190128070 A | | 11/2019 |
| WO | 2017062448 A1 | | 4/2017 |

* cited by examiner

METHOD FOR UNLOCKING A MOTOR VEHICLE AND FOR ENABLING AN ENGINE START OF A MOTOR VEHICLE

BACKGROUND AND SUMMARY OF THE INVENTION

Exemplary embodiments of the invention relate to a method for unlocking a motor vehicle and for enabling an engine start of a motor vehicle by means of a vehicle key of the motor vehicle, as well as to the motor vehicle having a control system for carrying out the specified method.

US 2017/0164192 A1 and US 2017/0149946 A1 disclose using a digital vehicle key to unlock a motor vehicle and to enable an engine start of the motor vehicle. It is also known to connect a control system of the motor vehicle with the digital vehicle key via a BLE connection (BLE: Bluetooth Low Energy). For this purpose, depending on the vehicle architecture, the motor vehicle can comprise several BLE nodes in its interior and outside its interior—for example on the bumpers. An uninterrupted BLE coverage in and around the motor vehicle can thus be guaranteed. As the customer approaches, the digital vehicle key connects to any BLE node outside the interior of the motor vehicle and the control system can now unlock the motor vehicle. Disadvantageously, the BLE connection with the BLE nodes worsens drastically and can even be interrupted if the customer enters the interior of the motor vehicle after successfully unlocking the motor vehicle. Depending on the vehicle key—and in particular depending on the BLE monitoring interval or on the BLE supervision timeout—it can take up to 20 seconds to form a new BLE connection with another BLE node of the motor vehicle. After the successful connection and before the engine start of the motor vehicle is enabled, data is additionally exchanged between the vehicle key and the control system via the BLE connection for a drive authorization. In this time, it is not possible to start the motor vehicle.

Exemplary embodiments of the invention are directed to an improved or at least an alternative method for unlocking a motor vehicle and for enabling an engine start of the motor vehicle by means of a vehicle key, in which the disadvantages described are overcome. A motor vehicle having a control system for carrying out the method should additionally be provided.

A method according to the invention is provided for unlocking a motor vehicle and for enabling an engine start of the motor vehicle by means of a vehicle key of the motor vehicle. The motor vehicle has a control system for carrying out the method. Additionally, the motor vehicle has at least one outer node for wireless connection with the vehicle key outside an interior of the motor vehicle. Additionally, the motor vehicle has at least one inner node for wireless connection with the vehicle key inside the interior of the motor vehicle. In the method, a wireless connection is first produced between the vehicle key and the at least one outer node of the motor vehicle. In the method, the motor vehicle is then unlocked via the control system. In the method, the existing wireless connection between the vehicle key and the at least one outer node is then forcibly ended via the control system. A new wireless connection is thus forcibly produced between the vehicle key and the at least one inner node of the motor vehicle via the control system. The production of the wireless connection, the unlocking of the motor vehicle, the forced ending of the existing wireless connection, and the forced production of the new wireless connection are carried out one after the other in the method as required in the specified order.

The term "vehicle key" should be understood broadly in the context of the present invention. The vehicle key can advantageously be digital. The vehicle key can advantageously be a so-called smart device. The wireless connection can advantageously be a BLE-based connection (BLE: Bluetooth Low Energy). By the interior of the motor vehicle, the passenger compartment of the motor vehicle is primarily meant. The at least one outer node is provided for wireless connection with the vehicle key, which is currently located outside the interior of the motor vehicle. As required, the at least one outer node can be positioned on the outside of the motor vehicle—for example on the bumpers of the motor vehicle. The at least one inner node is provided for wireless connection with the vehicle key, which is currently located inside the interior of the motor vehicle. As required, the at least one inner node can be arranged inside the interior of the motor vehicle—for example in the central console.

In the method according to the invention, the existing wireless connection is forced to end by the control system, such that the new wireless connection can be formed relatively quickly. The time that the customer takes to open a driver's door and to enter the motor vehicle is used to produce the new wireless connection between the vehicle key and the inner node. Once the customer has entered the motor vehicle, the new wireless connection has thus already been formed and the motor vehicle can be started quickly.

Advantageously, the forced ending of the existing wireless connection between the vehicle key and the outer node via the control system can be implemented by all outer nodes being deactivated by the control system. Advantageously, when the new wireless connection is forcibly produced between the vehicle key and the at least one inner node of the motor vehicle, the vehicle key can be exclusively wirelessly connected to the at least one inner node. Advantageously, the forced production of the new wireless connection between the vehicle key and the at least one inner node of the motor vehicle via the control system can be implemented by the vehicle key being able to be exclusively wirelessly connected to the at least one inner node after the existing wireless connection between the vehicle key and the outer node has been forcibly ended.

It can advantageously be provided that the forced ending of the existing wireless connection between the vehicle key and the at least one outer node via the control system is implemented only after a driver's door of the motor vehicle has been opened. In other words, the opening of the driver's door can be used by the control system as a trigger signal to forcibly end the existing wireless connection. The existing wireless connection is not interrupted as long as the customer has not entered the motor vehicle. The customer can thus lock the motor vehicle without issue—for example after loading shopping and without entering the motor vehicle—without interrupting the existing wireless connection.

It can advantageously be provided that the at least one outer node is regulated or controlled by an access system of the control system and the at least one inner node is regulated or controlled by a drive authorization system of the control system. Advantageously, the access system can, for example, check the access authorization and regulate or control the unlocking of the vehicle. Advantageously, the drive authorization system can, for example, check the drive authorization and regulate or control the enabling of an engine start. Of course, the access system and the drive authorization system can also regulate or control further functions of the motor vehicle.

It can advantageously be provided that a switch of responsibility from the access system of the control system to the drive authorization system of the control system is implemented by forcibly ending the existing wireless connection between the vehicle key and the at least one outer node, and by forcibly producing the new wireless connection between the vehicle key and the at least one inner node of the motor vehicle. In other words, the responsibility of the access system is ended with the forced ending of the existing connection, and the responsibility of the drive authorization system is started with the forced production of the new wireless connection.

It can advantageously be provided that the control system, in particular the drive authorization system, initiates an enabling of the engine start of the motor vehicle after the new wireless connection between the vehicle key and the at least one inner node of the motor vehicle has been forcibly produced.

It can advantageously be provided that the control system, in particular the drive authorization system, enables terminals to generate a permanent or a switched ignition pulse and/or deactivates an immobilizer that preferably comprises a gearbox control device and/or a steering wheel lock after the new wireless connection between the vehicle key and the at least one inner node of the motor vehicle has been forcibly produced. As an alternative or in addition, the control system, in particular the drive authorization system, can also activate a climate control unit. The enabling of the terminals and/or the deactivation of the immobilizer and/or the activation of the climate control unit can be implemented simultaneously or one after the other.

Exemplary embodiments of the invention also relate to a motor vehicle having a vehicle key and a control system. The motor vehicle has at least one outer node for wireless connection with the vehicle key outside an interior of the motor vehicle. Additionally, the motor vehicle has at least one inner node for wireless connection with the vehicle key inside the interior of the motor vehicle. According to the invention, the control system of the motor vehicle is designed to carry out the method described above. To avoid repeats, reference is made at this point to the embodiments above.

Further important features and advantages of the invention result from the sub-claims, from the drawings and from the associated description of figures with reference to the drawings.

Naturally, the features specified above and the features still to be explained in the following can be used not only in the respectively specified combination, but also in other combinations or in isolation without leaving the scope of the present invention.

Preferred embodiments of the invention are depicted in the drawings and are explained in more detail in the following description, wherein identical reference numerals relate to identical or similar or functionally identical components.

BRIEF DESCRIPTION OF THE DRAWING FIGURES

In the drawings, respectively schematically:

DETAILED DESCRIPTION

Figure 1:
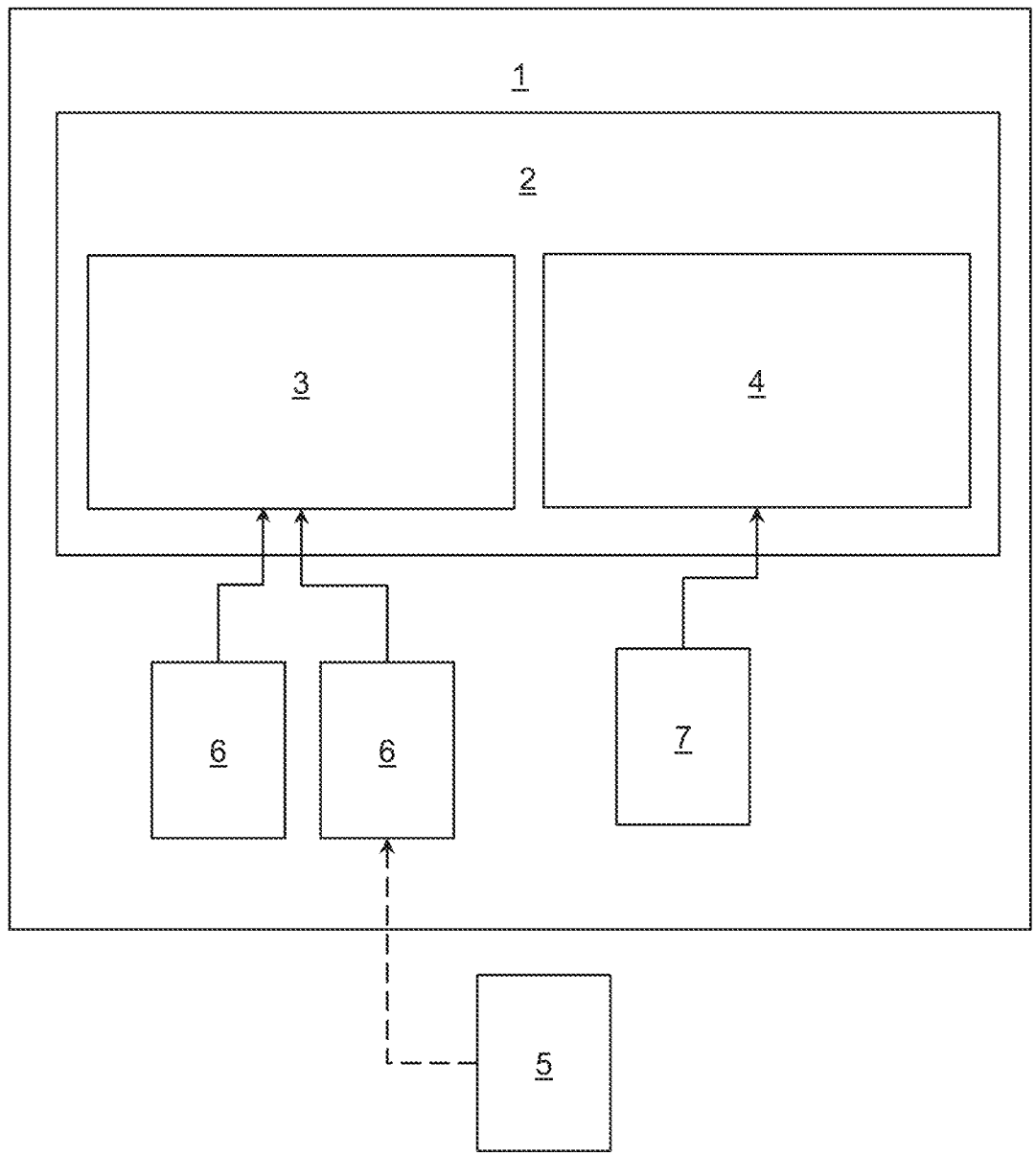
FIG. 1 shows a purely schematic view of a motor vehicle according to the invention.

FIG. 1 shows a purely schematic view of a motor vehicle 1 according to the invention. The motor vehicle 1 has a control system 2 having an access system 3 and a drive authorization system 4, as well as a digital vehicle key 5. The motor vehicle 1 additionally has several-here two-outer nodes 6 and an inner node 7. The outer nodes 6 are assigned to the access system 3, as is indicated by solid arrows. The inner node 7 is assigned to the drive authorization system 4, as is indicated with a further solid arrow.

The respective outer node 6—not shown here—is arranged on the outside of the motor vehicle 1 and can, in particular, connect to the vehicle key 5 if the vehicle key 5 is currently located outside an interior of the motor vehicle 1 or outside the motor vehicle 1. The respective outer node 6 is provided for wireless connection with the vehicle key 5. The wireless connection can, for example, be a BLE-based connection and is here indicated with a dashed arrow. One outer node 6 can, for example, be arranged on a front bumper of the motor vehicle 1, and the other outer node 6 can, for example, be arranged on a rear bumper of the motor vehicle 1.

The inner node 7—not shown here—is arranged inside an interior of the motor vehicle 1 and can, in particular, connect to the vehicle key 5 if the vehicle key 5 is currently located inside the interior of the motor vehicle 1 or inside the motor vehicle 1. The inner node 7 is provided in the same manner for wireless connection with the vehicle key 5. The inner node 7 can, for example, be arranged in the central console of the motor vehicle 1.

Figure 2:
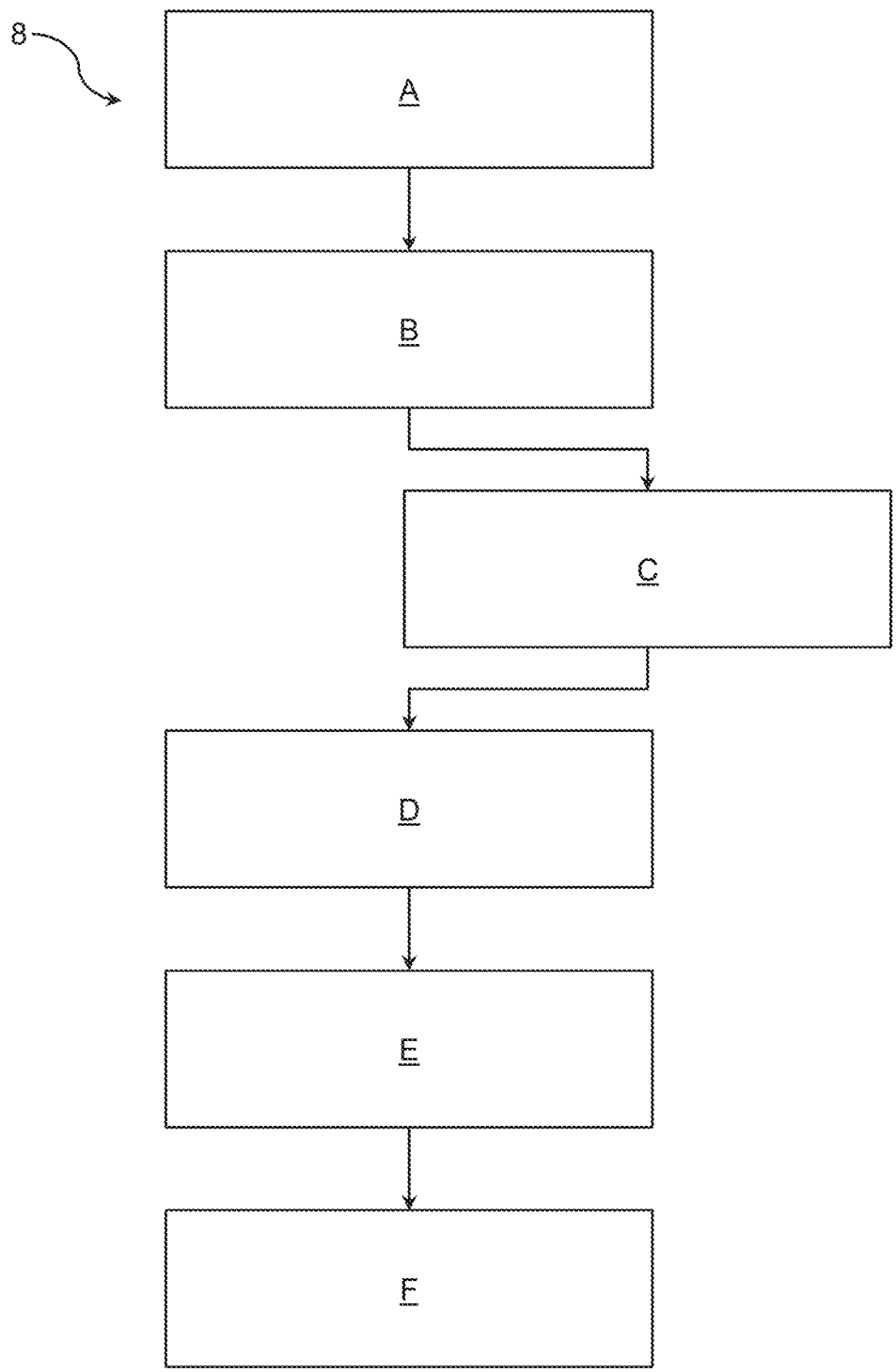
FIG. 2 shows a schematic sequence of a method according to the invention.

FIG. 2 schematically shows a sequence of a method 8 according to the invention. In the method 8 according to the invention, step A is first carried out. In step A, a wireless connection is produced between the vehicle key 5 and one of the outer nodes 6 of the motor vehicle 1. Step A is also shown in FIG. 1. Subsequently, the motor vehicle 1 is unlocked in step B by the control system 2 or the access system 3 of the control system 2.

In step C, a driver's door of the motor vehicle 1 is opened. The opening of the driver's door in step C is implemented by the customer and is used in the method 8 as a trigger signal for a next step D. Advantageously, the method 8 can also be carried out without step C. In this case, step D is carried out after step B.

In step D, the existing wireless connection between the vehicle key 5 and the at least one outer node 6 is forcibly ended via the control system 2. All outer nodes 6 are deactivated in this case. In a following step E, a new wireless connection between the vehicle key 5 and the inner node 7 is forcibly produced.

Subsequently, in a step F, an engine start of the motor vehicle 1 can be enabled by the control system 2 or the drive authorization system 4. The start of the motor vehicle 1 can then be triggered or initiated by the customer. In addition, the control system 2 or the drive authorization system 4 can deactivate an immobilizer when enabling the engine start of the motor vehicle 1. In addition, a climate control unit or further systems of the motor vehicle 1 can also be activated before or after the step F.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for unlocking a motor vehicle and enabling an engine start of the motor vehicle by a vehicle key of the motor vehicle, the method comprising:
   first, producing, by a control system of the motor vehicle, a wireless connection between the vehicle key and at least one outer node of the motor vehicle;
   second, unlocking, by the control system, the motor vehicle;
   third, forcibly ending, by the control system, the wireless connection between the vehicle key and the at least one outer node; and
   fourth, forcibly producing, by the control system, a new wireless connection between the vehicle key and at least one inner node of the motor vehicle,
   wherein the at least one outer node is configured to establish the wireless connection outside of an interior of the motor vehicle and the at least one inner node is configured to establish the new wireless connection inside the interior of the motor vehicle,
   wherein the forcibly ending of the wireless connection between the vehicle key and the at least one outer node is implemented only after a driver's door of the motor vehicle has been opened, and
   wherein the wireless connection between the vehicle key and the at least one outer node is not forcibly ended as long as a person has not entered the motor vehicle.

2. The method of claim 1, wherein the at least one outer node comprises a plurality of outer nodes, and wherein the forcibly ending of the wireless connection between the vehicle key and the at least one outer node is performed to deactivate all of the plurality of outer nodes.

3. The method of claim 1, wherein when the new wireless connection is forcibly produced between the vehicle key and the at least one inner node, the vehicle key is exclusively wirelessly connected to the at least one inner node.

4. The method of claim 1, wherein the forcibly produced new wireless connection includes the vehicle key being exclusively wirelessly connected to the at least one inner node after the wireless connection between the vehicle key and the at least one outer node has been forcibly ended.

5. The method of claim 1, wherein the at least one outer node is regulated or controlled by an access system of the control system and the at least one inner node is regulated or controlled by a drive authorization system of the control system.

6. The method of claim 5, wherein a switch of responsibility from the access system to the drive authorization system is performed by the forcibly ending the wireless connection between the vehicle key and the at least one outer node, and by the forcibly producing the new wireless connection between the vehicle key and the at least one inner node of the motor vehicle.

7. The method of claim 5, wherein after the new wireless connection between the vehicle key and the at least one inner node of the motor vehicle has been forcibly produced, the drive authorization system initiates an enabling of the engine start of the motor vehicle.

8. The method of claim 5, wherein after the forcibly producing of the new wireless connection between the vehicle key and the at least one inner node, the drive authorization system
   enables terminals to generate a permanent or a switched ignition pulse, deactivates an immobilizer comprising a gearbox control device, or deactivates a steering wheel lock, or
   activates a climate control unit.

9. A motor vehicle, comprising:
   a vehicle key;
   a control system;
   at least one outer node, coupled to the control system, configured to wirelessly connect with the vehicle key outside an interior of the motor vehicle; and
   at least one inner node, coupled to the control system, configured to wirelessly connect with the vehicle key inside the interior of the motor vehicle,
   wherein the control system is configured to
      first, produce a wireless connection between the vehicle key and at least one outer node of the motor vehicle,
      second, unlock the motor vehicle,
      third, forcibly end the wireless connection between the vehicle key and the at least one outer node, and
      fourth, forcibly produce a new wireless connection between the vehicle key and at least one inner node,
   wherein the control system is configured to forcibly end the wireless connection between the vehicle key and the at least one outer node only after a driver's door of the motor vehicle has been opened, and
   wherein the control system is configured so that the wireless connection between the vehicle key and the at least one outer node is not forcibly ended as long as a person has not entered the motor vehicle.

* * * * *